(12) United States Patent
Wang et al.

(10) Patent No.: US 10,018,092 B2
(45) Date of Patent: Jul. 10, 2018

(54) MODEL PREDICTIVE CONTROL FOR MULTI-CAN SELECTIVE CATALYTIC REDUCTION SYSTEM

(71) Applicant: GM GLOBAL TECHNOLOGY OPERATIONS LLC, Detroit, MI (US)

(72) Inventors: Yue-Yun Wang, Troy, MI (US); Giuseppe Mazzara Bologna, Nicosia (IT); Carlos Ildefonso Hoyos Velasco, Turin (IT); Vincenzo Alfieri, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 15/359,857

(22) Filed: Nov. 23, 2016

(65) Prior Publication Data

US 2018/0142593 A1 May 24, 2018

(51) Int. Cl.
*F01N 3/00* (2006.01)
*F01N 3/20* (2006.01)
*F01N 11/00* (2006.01)
*B01D 53/94* (2006.01)

(52) U.S. Cl.
CPC .......... *F01N 3/208* (2013.01); *B01D 53/9431* (2013.01); *B01D 53/9495* (2013.01); *F01N 11/007* (2013.01); *F01N 2550/02* (2013.01); *F01N 2550/05* (2013.01); *F01N 2610/02* (2013.01); *F01N 2610/146* (2013.01); *F01N 2900/0404* (2013.01); *F01N 2900/0408* (2013.01); *F01N 2900/1616* (2013.01); *F01N 2900/1621* (2013.01); *F01N 2900/1622* (2013.01)

(58) Field of Classification Search
USPC .......... 60/274, 276, 277, 286, 295, 297, 301
See application file for complete search history.

(56) References Cited

U.S. PATENT DOCUMENTS

| 7,810,476 | B2 | 10/2010 | Wang et al. |
| 8,091,416 | B2 | 1/2012 | Wang et al. |
| 8,201,444 | B2 | 6/2012 | Wang et al. |
| 8,276,373 | B2 | 10/2012 | Wang et al. |
| 8,392,091 | B2 | 3/2013 | Hebbale et al. |

(Continued)

*Primary Examiner* — Binh Q Tran
(74) *Attorney, Agent, or Firm* — Quinn IP Law (57) ABSTRACT

Disclosed are model predictive control (MPC) systems, methods for using such MPC systems, and motor vehicles with selective catalytic reduction (SCR) employing MPC control. An SCR-regulating MPC control system is disclosed that includes an NOx sensor for detecting nitrogen oxide (NOx) input received by the SCR system, catalyst NOx sensors for detecting NOx output for two SCR catalysts, and catalyst NH3 sensors for detecting ammonia (NH3) slip for each SCR catalyst. The MPC system also includes a control unit programmed to: receive desired can conversion efficiencies for the SCR catalysts; determine desired can NOx outputs for the SCR catalysts; determine maximum NH3 storage capacities for the SCR catalyst; calculate the current can conversion efficiency for each SCR catalyst; calculate an optimized reductant pulse-width and/ or volume from the current can conversion efficiencies; and, command an SCR dosing injector to inject a reductant into an SCR conduit based on the calculated pulse-width/volume.

20 Claims, 3 Drawing Sheets

(56) References Cited

U.S. PATENT DOCUMENTS

| | | | |
|---|---|---|---|
| 8,453,434 B2* | 6/2013 | Yacoub | F01N 3/208 60/286 |
| 8,578,705 B2* | 11/2013 | Sindano | F01N 3/208 60/295 |
| 8,596,042 B2* | 12/2013 | Parmentier | F01N 3/208 60/275 |
| 8,612,119 B2 | 12/2013 | Wang et al. | |
| 8,694,197 B2 | 4/2014 | Rajagopalan et al. | |
| 9,133,750 B2 | 9/2015 | Levijoki et al. | |
| 2008/0051973 A1 | 2/2008 | Gangopadhyay et al. | |
| 2010/0028228 A1* | 2/2010 | Gady | B01D 53/90 423/213.5 |
| 2010/0107609 A1* | 5/2010 | Parmentier | B01D 53/90 60/286 |
| 2012/0085082 A1 | 4/2012 | Levijoki et al. | |
| 2012/0286063 A1 | 11/2012 | Wang et al. | |
| 2015/0096287 A1* | 4/2015 | Qi | F01N 3/208 60/286 |

\* cited by examiner

MODEL PREDICTIVE CONTROL FOR MULTI-CAN SELECTIVE CATALYTIC REDUCTION SYSTEM

INTRODUCTION

The present disclosure relates generally to exhaust aftertreatment systems for regulating engine emissions. More specifically, aspects of this disclosure relate to predictive control strategies of aftertreatment nitrogen oxide (NOx) reduction for internal combustion engine (ICE) assemblies.

Current production motor vehicles, such as the modern-day automobile, are originally equipped with a powertrain that operates to propel the vehicle and power the onboard vehicle electronics. The powertrain, which is inclusive of and oftentimes misclassified as a drivetrain, is generally comprised of a prime mover that delivers driving power to the vehicle's final drive system (e.g., rear differential, axle, and wheels) through a multi-speed power transmission. Automobiles have generally been powered by a reciprocating-piston type internal combustion engine because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid vehicles, on the other hand, utilize alternative power sources, such as battery powered electric motor-generators, to propel the vehicle, minimizing reliance on the engine for power and, thus, increasing overall fuel economy.

A typical overhead valve internal combustion engine includes an engine block with a series of cylinder bores, each of which has a piston reciprocally movable therein. Coupled to a top surface of the engine block is a cylinder head that cooperates with the piston and cylinder bore to form a variable-volume combustion chamber. These reciprocating pistons are used to convert pressure—generated by igniting a fuel-and-air mixture in the combustion chamber—into rotational forces to drive a crankshaft. The cylinder head defines intake ports through which air, provided by an intake manifold, is selectively introduced to each combustion chamber. Also defined in the cylinder head are exhaust ports through which exhaust gases and byproducts of combustion are selectively evacuated from the combustion chambers to an exhaust manifold. The exhaust manifold, in turn, collects and combines the exhaust gases for recirculation into the intake manifold, delivery to a turbine-driven turbocharger, and/or evacuation from the ICE via an exhaust system.

Exhaust gases produced during each combustion work cycle of an ICE assembly normally includes particulate matter and other known by-products of combustion, such as carbon monoxide (CO), hydrocarbons (HC), volatile organic compounds (VOCs), and nitrogen oxides (NOx). Exhaust aftertreatment systems operate to oxidize unburned hydrocarbons and carbon monoxide to carbon dioxide and water, and to reduce mixtures of nitrogen oxides to nitrogen and water before the gas is released into the atmosphere. Exhaust treatment may incorporate, singly and in any combination, an oxidation catalyst (OC), NOx absorbers/adsorbers, exhaust gas recirculation (EGR), a selective catalytic reduction (SCR) system, a particulate matter (PM) filter, catalytic converters and other means of emissions control. Selective catalytic reduction is an advanced active emissions control technology that injects a dosing agent, such as anhydrous or aqueous ammonia ($NH_3$) or automotive-grade urea (otherwise known as Diesel Exhaust Fluid (DEF)), into the exhaust gas stream. This dosing agent includes a reductant that is absorbed onto an SCR catalyst surface, then reacts with the NOx in the exhaust gas. The SCR catalyst may then break down or reduce the NOx into water vapor ($H_2O$) and nitrogen gas ($N_2$).

SUMMARY

Disclosed herein are multivariable model predictive control (MPC) algorithms and control systems for regulating selective catalytic reduction (SCR) of internal combustion engine (ICE) assemblies, methods for making and methods for using such MPC control systems, internal combustion engines having multivariable SCR MPC control capabilities, and motor vehicles equipped with such engines. By way of example, and not limitation, there is presented a unique Linear Parameter Varying (LPV) MPC control strategy and architecture for a two-can SCR system to help maximize nitrogen oxide (NOx) conversion efficiency and minimize ammonia slip. This control strategy takes into consideration non-uniform distribution of ammonia ($NH_3$) storage in modeling with optimized CAN sizing. A simplified and reduced-order SCR model is employed to help reduce model and control calibration. By employing this optimization control methodology, an SCR controller may achieve an improved trade-off between NOx conversion and $NH_3$ slip. The optimization control algorithm may employ a simplified Extended Kalman Filter (EKF) with real-time data updates.

Aspects of the present disclosure are directed to multivariable MPC control architectures for commercial and industrial boilers, gas turbines, and reciprocating-piston type internal combustion engine assemblies with SCR functionality. Disclosed, for example, is an MPC control system for regulating operation of an SCR system. The SCR system has two fluidly coupled SCR catalysts (known colloquially as "cans"), and a storage tank for storing a reductant (e.g., urea). An SCR fluid conduit fluidly connects the storage tank to the SCR catalysts, and an electronic dosing injector is operable to selectively inject reductant into an NOx-entrained exhaust stream passing through the conduit and into the catalysts. The MPC control system includes various detection devices for monitoring system operation. For instance, one or more NOx sensors detect a current NOx input received by the conduit, one or more catalyst NOx sensors detect a respective current NOx output for each of the SCR catalysts, and one or more catalyst $NH_3$ sensors detect a respective current $NH_3$ slip volume for each SCR catalyst.

A programmable electronic control unit (ECU) is communicatively connected to the conduit NOx sensor, the SCR catalyst NOx sensor(s), the SCR catalyst $NH_3$ sensor(s), and the SCR dosing injector. This ECU is configured to: receive an indication of a respective desired can conversion efficiency for each SCR catalyst; determine, from these desired can conversion efficiencies, a respective desired can NOx output for each SCR catalyst; determine a respective maximum $NH_3$ storage capacity for each SCR catalyst; calculate a respective current can conversion efficiency for each SCR catalyst; calculate a modified reductant injection parameter (e.g., optimal pulse-width and/or reductant volume) from the current can conversion efficiencies for the SCR catalysts; and, command the dosing injector to inject the reductant into the conduit based on the modified reductant injection parameter. Current can conversion efficiency can be calculated, for example, from current NOx input, current can NOx outputs, desired can NOx outputs, current can $NH_3$ slip volumes, maximum can NH3 storage capacities, and ammonia coverage ratio for the first and second SCR catalysts.

Other aspects of the present disclosure are directed to motor vehicles with reciprocating-piston-type engines and SCR exhaust aftertreatment systems with MPC control capabilities. A "motor vehicle," as used herein, may include any relevant vehicle platform, such as passenger vehicles (internal combustion engine (ICE), hybrid, fuel cell, fully or partially autonomous, etc.), commercial vehicles, industrial vehicles, tracked vehicles, off-road and all-terrain vehicles (ATV), farm equipment, boats, airplanes, trains, etc. In an example, a motor vehicle is presented that includes a vehicle body with an engine compartment, and an internal combustion engine (ICE) assembly stowed in the engine compartment. The ICE assembly includes an engine block with multiple cylinders bores, and a piston reciprocally movable within each one of the cylinder bores. An SCR exhaust aftertreatment system is fluidly coupled to the ICE assembly. The SCR system includes a first SCR catalyst fluidly coupled in series with a second SCR catalyst, and a storage tank storing a fluid reductant. An SCR conduit fluidly connects the storage tank to the two SCR catalysts, and a dosing injector is selectively operable to inject reductant into NOx entrained exhaust streams passing through the SCR fluid conduit. For certain applications, the second SCR catalyst can be removed to leave the SCR system with a single can.

A fluid conduit NOx sensor monitors in real-time or otherwise detects the current NOx input received by the SCR fluid conduit from the ICE assembly. This engine out NOx sensor can be replaced by a NOx virtual sensor or estimate based on an engine out NOx model. Likewise, a pair of SCR catalyst NOx sensors each monitors in real-time or otherwise detects a respective current NOx output of a respective one of the SCR catalysts, while a pair of SCR catalyst NH3 sensors each monitors in real-time or otherwise detects a respective current NH3 slip volume of a respective one of the SCR catalysts. In optional configurations, an SCR catalyst NOx sensor monitors a respective current NOx output of the first SCR catalyst, while an NH3 sensor monitors in real-time or otherwise detects a respective current NH3 slip volume of the second SCR catalyst. In yet another optional configuration, an SCR catalyst NH3 sensor monitors a respective current NH3 slip out from the first SCR catalyst, while an NOx sensor monitors in real-time or otherwise detects a respective current NOx output of the second SCR catalyst. An electronic control unit (e.g., an engine controller) communicates with the foregoing sensors and the SCR system. The electronic control unit is programmed to: receive indications of desired can conversion efficiencies for each the SCR catalysts; determine, from these desired can conversion efficiencies, desired can NOx outputs for the SCR catalysts; determine maximum NH3 storage capacities of the SCR catalysts; calculate current can conversion efficiencies for SCR catalysts, e.g., from the current SCR NOx input, current can NOx outputs, desired can NOx outputs, current can NH3 slip, and maximum can NH3 storage capacities; calculate a modified reductant injection parameter from the current can conversion efficiencies for the SCR catalysts; and regulate operation of the SCR dosing injector based on the calculated modified reductant injection parameter.

Additional aspects of this disclosure are directed to methods of making and methods of using multivariable MPC control architectures with closed-loop functionality for regulating operation of SCR exhaust aftertreatment systems. For instance, a method is disclosed for operating an MPC control system for regulating an SCR exhaust aftertreatment system. The method includes, in any order and in any combination: receiving, from a fluid conduit NOx sensor, a signal indicative of a current nitrogen oxide (NOx) input received by the conduit; receiving, from first and second SCR catalyst NOx sensors, signals indicative of first and second current NOx outputs of the first and second SCR catalysts, respectively; receiving, from first and second SCR catalyst NH3 sensors, signals indicative of first and second current ammonia (NH3) slip volumes of the first and second SCR catalysts, respectively; receiving indications first and second desired can conversion efficiencies of the first and second SCR catalysts, respectively; determining, from the first and second desired can conversion efficiencies, first and second desired can NOx outputs for the first and second SCR catalysts, respectively; determining first and second maximum NH3 storage capacities of the first and second SCR catalysts, respectively; calculating a respective current can conversion efficiency for each of the SCR catalysts from the current NOx input, first and second current NOx outputs first and second desired can NOx outputs, first and second current NH3 slip volumes, and first and second maximum NH3 storage capacities; calculating a modified reductant injection parameter from the first and second current can conversion efficiencies for the SCR catalysts; and commanding the dosing injector to inject the reductant into the conduit based on the modified reductant injection parameter.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
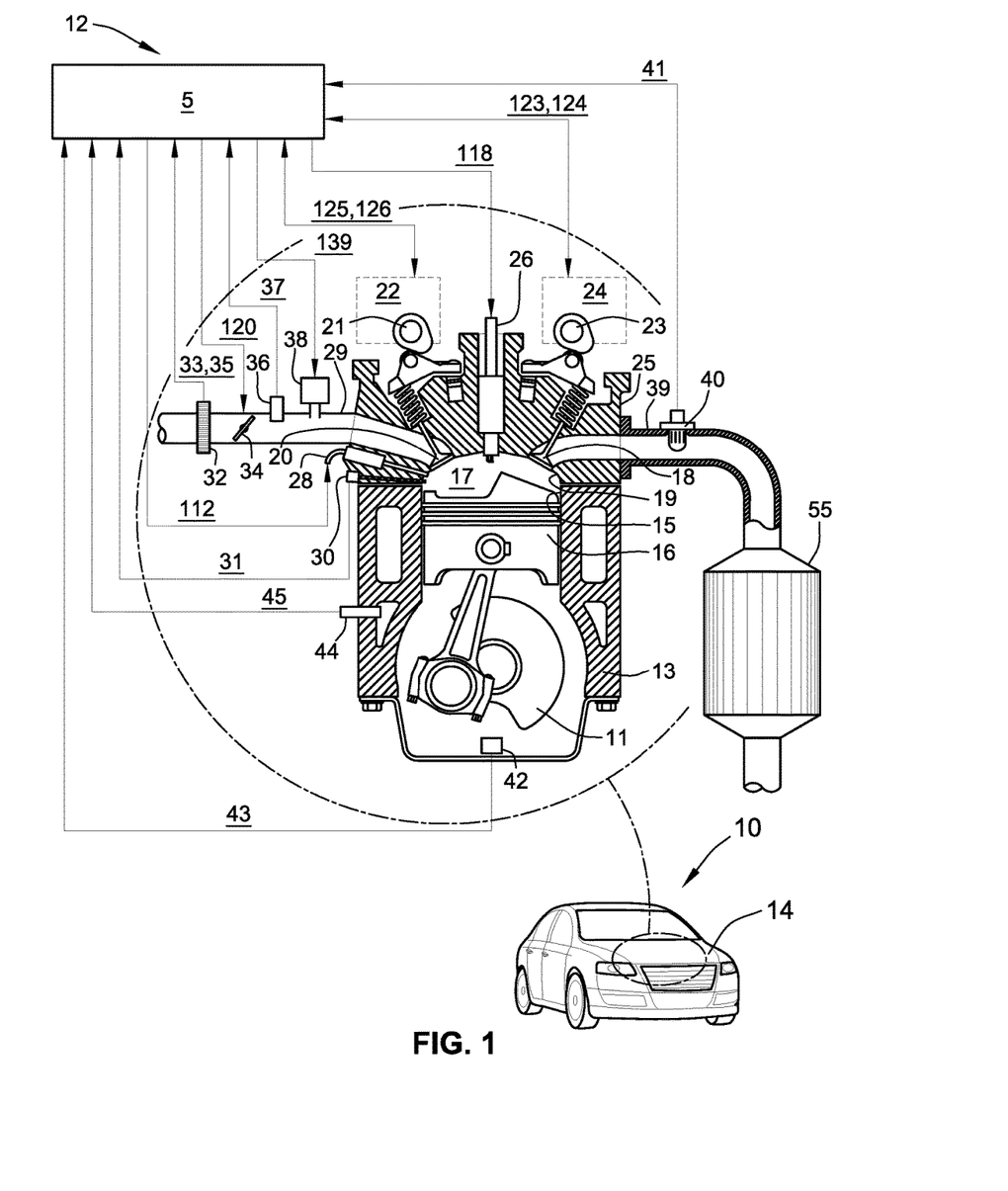
FIG. 1 is a front perspective-view illustration of a representative motor vehicle with an inset schematic illustration of a representative reciprocating-piston type internal combustion engine (ICE) assembly with multi-can selective catalytic reduction (SCR) capabilities in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted at a forward portion of the automobile 10, e.g., aft of a front bumper fascia and grille and forward of a passenger compartment, is an internal combustion engine (ICE) assembly 12 housed within an engine compartment covered by an engine hood 14. The illustrated automobile 10—also referred to herein as "motor vehicle" or "vehicle" for short—is merely an exemplary application with which the novel aspects and features of this disclosure may be practiced. In the same vein, the implementation of the present concepts into a spark ignited direct injection (SIDI) engine configuration should also be appreciated as an exemplary application of the novel concepts disclosed herein. As such, it will be understood that the aspects and features of the present disclosure may be applied to other engine architectures, implemented for other exhaust aftertreatment systems, and utilized for any logically relevant type of motor vehicle. In the same vein, aspects of this disclosure can be utilized for non-vehicle based applications, such as large electric utility boilers, industrial-grade boilers, process heaters, gas turbines, etc. Lastly, the drawings presented herein are not necessarily to scale and are provided purely for instructional purposes. Thus, the specific and relative dimensions shown in the drawings are not to be construed as limiting.

There is shown in FIG. 1 an example of a multi-cylinder, dual overhead cam (DOHC), inline-type ICE assembly 12. The illustrated ICE assembly 12 is a four-stroke reciprocating-piston engine configuration that operates to propel the vehicle 10, for example, as a direct injection gasoline engine, including flexible-fuel vehicle (FFV) and hybrid vehicle variations thereof. The ICE assembly 12 may optionally operate in any of an assortment of selectable combustion modes, including a homogeneous-charge compression-ignition (HCCI) combustion mode and other compression-ignition (CI) combustion modes. Additionally, the ICE assembly 12 may operate at a stoichiometric air/fuel ratio and/or at an air/fuel ratio that is primarily lean of stoichiometry. This engine 12 includes a series of reciprocating pistons 16 slidably movable in cylinder bores 15 of an engine block 13. The top surface of each piston 16 cooperates with the inner periphery of its corresponding cylinder 15 and a recessed chamber surface 19 of a cylinder head 25 to define a variable volume combustion chambers 17. Each piston 16 is connected to a rotating crankshaft 11 by which linear reciprocating motion of the pistons 16 is output, for example, to a power transmission (not shown) as rotational motion via the crankshaft 11.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and controlling the air flow. The air intake devices may include, as a non-limiting example, a mass airflow sensor 32 for monitoring mass airflow (MAF) 33 and intake air temperature (IAT) 35. A throttle valve 34 controls airflow to the ICE assembly 12 in response to a control signal (ETC) 120 from a programmable engine control unit (ECU) 5. A pressure sensor 36 in the intake manifold 29 monitors, for instance, manifold absolute pressure (MAP) 37 and barometric pressure. An external flow passage recirculates exhaust gases from engine exhaust to the intake manifold 29, e.g., via a control valve in the nature of an exhaust gas recirculation (EGR) valve 38. The programmable engine control unit 5 controls mass flow of exhaust gas to the intake manifold 29 by controlling opening of the EGR valve 38 via EGR command 139. In FIG. 1, the arrows connecting ECU 5 with the various components of the ICE assembly 12 are emblematic of electronic signals or other communication exchanges by which data and/or control commands are transmitted from one component to the other.

Airflow from the intake manifold 29 into each combustion chamber 17 is controlled by one or more dedicated intake engine valves 20. Evacuation of exhaust gases out of the combustion chamber 17 to an exhaust aftertreatment system 55 via an exhaust manifold 39 is controlled by one or more dedicated exhaust engine valves 18. In accord with at least some of the disclosed embodiment, exhaust aftertreatment system 55 includes an exhaust gas recirculation (EGR) system and/or a selective catalytic reduction (SCR) system. The engine valves 18, 20 are illustrated herein as spring-biased poppet valves; however, other known types of engine valves may be employed. The ICE assembly 12 valve train system is equipped to control and adjust the opening and closing of the intake and exhaust valves 20, 18. According to one example, the activation of the intake and exhaust valves 20, 18 may be respectively modulated by controlling intake and exhaust variable cam phasing/variable lift control (VCP/VLC) devices 22 and 24. These two VCP/VLC devices 22, 24 are configured to control and operate an intake camshaft 21 and an exhaust camshaft 23, respectively. Rotation of these intake and exhaust camshafts 21 and 23 are linked and/or indexed to rotation of the crankshaft 11, thus linking openings and closings of the intake and exhaust valves 20, 18 to positions of the crankshaft 11 and the pistons 16. The intake VCP/VLC device 22 may be fabricated with a mechanism operative to switch and control valve lift of the intake valve(s) 20 in response to a control signal (iVLC) 125, and variably adjust and control phasing of the intake camshaft 21 for each cylinder 15 in response to a control signal (iVCP) 126. In the same vein, the exhaust VCP/VLC device 24 may include a mechanism operative to variably switch and control valve lift of the exhaust valve(s) 18 in response to a control signal (eVLC) 123, and variably adjust and control phasing of the exhaust camshaft 23 for each cylinder 15 in response to a control signal (eVCP) 124. The VCP/VLC devices 22, 24 may be actuated using any one of electro-hydraulic, hydraulic, electro-mechanic, and electric control force, in response to respective control signals eVLC 123, eVCP 124, iVLC 125, and iVCP 126.

With continuing reference to the representative configuration of FIG. 1, ICE assembly 12 employs a gasoline direct injection (GDI) fuel injection subsystem with multiple high-pressure fuel injectors 28 that directly inject pulses of fuel into the combustion chambers 17. Each cylinder 15 is provided with one or more fuel injectors 28, which activate in response to an injector pulse width command (INJ_PW) 112 from the ECU 5. These fuel injectors 28 are supplied with pressurized fuel by a fuel distribution system. One or more or all of the fuel injectors 28 may be operable, when activated, to inject multiple fuel pulses (e.g., a succession of first, second, third, etc., injections of fuel mass) per working cycle into a corresponding one of the ICE assembly cylinders 15. The ICE assembly 12 employs a spark-ignition subsystem by which fuel-combustion-initiating energy—typically in the nature of an abrupt electrical discharge—is provided via a spark plug 26 for igniting, or assisting in igniting, cylinder charges in each of the combustion chambers 17 in response to a spark command (IGN) 118 from the ECU 5. Aspects of the present disclosure may be similarly applied to compression-ignited (CI) diesel engines.

The ICE assembly 12 is equipped with various sensing devices for monitoring engine operation, including a crank sensor 42 having an output indicative of crankshaft rotational position, e.g., crank angle and/or speed (RPM) signal 43. A temperature sensor 44 is configured to monitor, for example, one or more engine-related temperatures (e.g., coolant temperature, fuel temperature, exhaust temperature, etc.), and output a signal 45 indicative thereof. An in-cylinder combustion sensor 30 is configured to monitor combustion-related variables, such as in-cylinder combustion pressure, charge temperature, fuel mass, air-to-fuel ratio, etc., and output a signal 31 indicative thereof. An exhaust gas sensor 40 is configured to monitor an exhaust-gas related variables, e.g., actual air/fuel ratio (AFR), burned gas fraction, etc., and output a signal 41 indicative thereof. The combustion pressure and the crankshaft speed may be monitored by the ECU 5, for example, to determine combustion timing, i.e., timing of combustion pressure relative to the crank angle of the crankshaft 11 for each cylinder 15 for each working combustion cycle. It should be appreciated that combustion timing may be determined by other methods. Combustion pressure may be monitored by the ECU 5 to determine an indicated mean effective pressure (IMEP) for each cylinder 15 for each working combustion cycle. The ICE assembly 12 and ECU 5 cooperatively monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Figure 2:
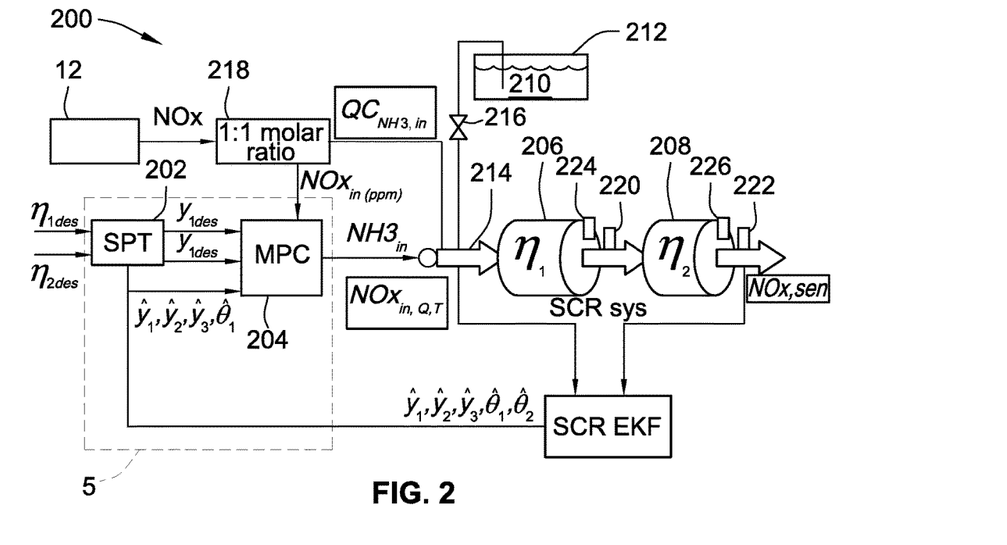
FIG. 2 is a schematic diagram of a representative two-can SCR Linear Parameter Varying (LPV) Model Predictive Control (MPC) control architecture in accordance with aspects of the present disclosure.

Presented in FIG. 2 is a representative Linear Parameter Varying (LPV) Model Predictive Control (MPC) system architecture, designated generally at 200, that is operable, for example, to help maximize NOx conversion efficiency and minimize ammonia slip while abating reductant injection volume for multi-can SCR systems. As will be described in further detail below, the LPV-MPC architecture 200 employs control-oriented SCR models that mathematically describe selected SCR dynamics identified as important for SCR control. By way of non-limiting example, the illustrated MPC architecture is designed to account for optimized can sizing and the non-uniform distribution of NH3 storage when performing control-oriented SCR modeling. Simplified and reduced order SCR models are utilized to help reduce model and control calibration. Through the implementation of optimization control algorithms, the system controller can improve aftertreatment system performance by optimizing the trade-off between NOx conversion, dispensed reductant, and NH3 slip.

In the illustrated example, portions of the LPV-MPC architecture 200 are shown generally embodied as interoperable control modules—a Set Point Transformation (SPT) module 202 and a Model Predictive Control (MPC) module 204—that may each comprise a respective software application with processor-executable instructions effectuated, for example, by the onboard engine control unit (ECU) 5 or a distinct SCR controller of motor vehicle 10 shown in FIG. 1. It is envisioned, for at least some embodiments, that each control module may comprise a discrete controller, microprocessor or other integrated circuit (IC) device, all of which are operatively interconnected to carry out any of the functions and features disclosed herein. The system architecture 200, while not per se limited, is portrayed regulating operation of a urea-based selective catalytic reduction (SCR) exhaust aftertreatment system 55 for reducing NOx emissions from compression-ignited (CI) diesel engines. SCR system 55 may implement piecewise-homogenous distribution of urea for first and second SCR catalysts 206 and 208, respectively. According to at least some of the disclosed concepts, SCR catalysts 206, 208 are fluidly connected in series, with the first SCR catalyst (or "first can") 206 constituting about 70% of total catalyst volume, while the second SCR catalyst (or "second can") 208 constitutes about 30% of the total catalyst volume. It is certainly within the scope of this disclosure to implement fewer or additional SCR catalysts and/or to augment the respective contribution of each catalyst to the total catalyst volume. In addition, the split of the total SCR volume between the two can SCR can be varying.

With continuing reference to FIG. 2, SCR exhaust aftertreatment system 55 receives exhaust gases, for example, from the combustion chambers of an internal combustion engine (e.g., via exhaust manifold 39 of ICE assembly 12 of FIG. 1), which may first pass through peripheral exhaust hardware, such as diesel particulate filter (DPF) or a diesel oxidation catalyst (DOC) (neither of which is shown in the drawings). A DPF functions to remove diesel particulate matter from diesel engine exhaust gases prior to being evacuated or recirculated. One of the functions of a DOC is to convert NO into NO2, an NOx form that is more readily treated in an SCR catalyst. DOC-treated exhaust gases are then directed to the SCR catalysts 206, 208, which utilize aqueous urea 210 (a mixture of approximately 32% urea and approximately 67% deionized water) or other functional dosing agent stored in a storage tank 212 as a reactant to reduce NOx into other constituents. The first SCR can 206 can also be combined with a DPF to form an integrated DPF/SCR system. An SCR fluid line 214 (or "conduit") fluidly connects the engine assembly 12 and storage tank 212 to the SCR catalysts 206, 208. A dosing injector 216, which may be in the nature of a solenoid-driven H-type or D-type spray valve, is selectively actuable to inject urea 210 into the SCR fluid line 214.

To provide closed-loop feedback operability, LPV-MPC system 200 may communicate with an assortment of onboard and off-board sensing devices, including those shown in FIGS. 1 and 2 and those described hereinabove and below, to aggregate relevant information for operation and optimization of the exhaust aftertreatment system 55. In FIG. 2, for instance, the ECU 5 communicates with one or more NOx sensors 218, 220 and 222, each of which may be in the nature of a solid-state electrochemical or amperometric NOx sensor, such as a high-temperature ceramic metal oxide NOx sensor with a sensitivity ranging from about 500-2000 parts per million (ppm). The NOx sensor 218 (also referred to herein as "fluid conduit NOx sensor") is operable to systematically/randomly track, monitor in real-time, or otherwise selectively detect the current NOx input received by the SCR system 55 via SCR fluid line 214 from the engine 12. In the same vein, each of the NOx sensors 220, 222 (also referred to herein as "first and second SCR catalyst NOx sensors") is operable to systematically/randomly track, monitor in real-time, or otherwise selectively detect the current NOx output of a respective one of the SCR catalysts 206, 208.

For aftertreatment system control, ECU 5 may also or alternatively communicate with one or more NH3 sensors, each of which may be in the nature of infrared, chemosorption (MOS), electrochemical, or solid-state (SS) charge-carrier-injection (CCI) sensors. These NH3 sensors 224, 226 (also referred to herein as "first and second SCR catalyst NH3 sensors") are operable to systematically/randomly track, monitor in real-time, or otherwise selectively detect the current ammonia slip volume of a respective one of the SCR catalysts 206, 208. Ammonia "slip" can be characterized as a measurable volume of unreacted ammonia discharged from an SCR catalyst (also referred to as "SCR outlet NH3"). During normal use, the ammonia injected into each SCR catalyst is primarily adsorbed onto a catalyst surface; however, some fraction will be desorbed from the catalyst surface into the exhaust stream and "slip out" from the catalyst. It is envisioned that the LPV-MPC system 200 utilize greater, fewer, and/or different sensing devices than that which are shown in the drawings.

Model Predictive Control (MPC) module 204, which is shown in FIG. 2 communicatively interconnected with the Set Point Transformation (SPT) module 202, exhaust aftertreatment system 55, and SCR system sensors 218, 220, 222, 224 and 226, receives dynamic system inputs, closed-loop feedback data, and predetermined system parameters, e.g., to calculate the optimized amount of urea injection based on the control-oriented modeling of the exhaust system. By way of example, and not limitation, SPT module 202 receives signals indicative of a (first) desired can conversion efficiency $\eta_{1des}$ for the first SCR catalyst 206 and a (second) desired can conversion efficiency $\eta_{2des}$ for the second SCR catalyst 208. Exhaust-gas-entrained NOx reacts with NH3 stored on the surface of each SCR catalyst, and is reduced into nitrogen N2 and water H2O in a chemical process known as "NOx reduction." In general, can conversion efficiency $\eta$ may be defined as the rate at which an SCR catalyst converts NOx to these less polluting constituents, where $$\eta=(NOx,in-NOx,out)/NOx,in$$

Figure 3:
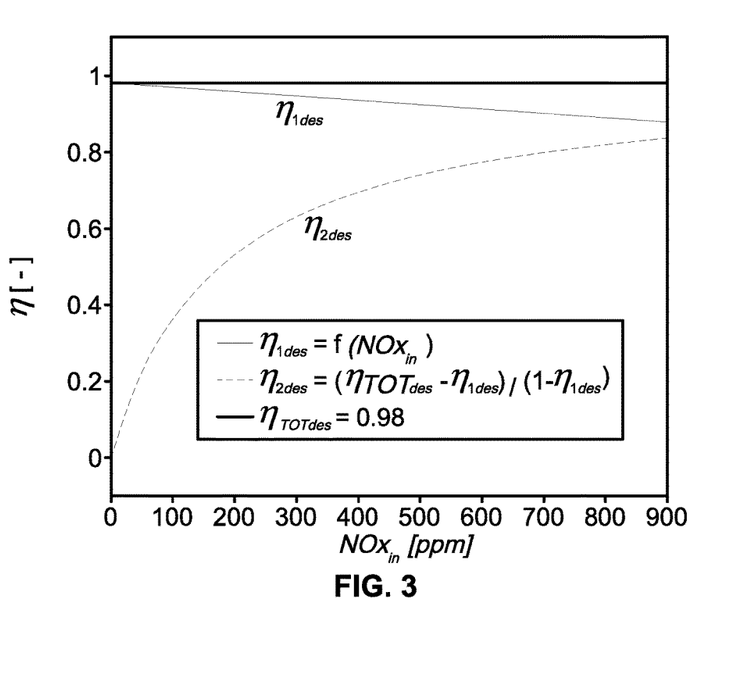
FIG. 3 is a chart illustrating an example of incoming nitrogen oxides (NOx) versus NOx conversion efficiency for the representative LPV-MPC control architecture of FIG. 2.

Inside an SCR catalyst, there are four primary reactions that determine how much ammonia is stored on a catalyst surface: (1) ammonia adsorption, where injected ammonia is adsorbed onto a catalyst surface; (2) NH3 desorption, where some NH3 on the SCR surface will be desorbed into the exhaust gas; (3) NOx reduction, as described above; and (4) ammonia oxidation, where some NH3 will be oxidized into oxygen and water. FIG. 3 portrays examples of desired NOx can conversion efficiencies versus incoming NOx for the first and second cans 206, 208 of FIG. 2.

Set Point Transformation (SPT) module 202 may be characterized as a block that, based on how much NOx is coming out of/received from the ICE engine 12, will transfer the desired NOx conversions $\eta_{1des}$ and $\eta_{2des}$ to desired outlet NOx $y_{1des}$ for $y_{2des}$ for both SCR cans 206 and 208, which will allow the MPC module 204 to designate an optimal control for the injected urea u2=NH3,in. A respective maximum NH3 storage capacity is determined for each of the first and second SCR catalysts 206, 208. Max NH3 storage capacity can be typified as a maximum amount of ammonia that can be stored in a catalyst at a given time. By comparison, SCR catalyst ammonia coverage ratio is the ratio of currently stored ammonia to the maximum ammonia storage capacity of the SCR catalyst, with a value between zero and one. For the illustrated SCR catalysts, a first ammonia coverage ratio $\theta_1$ for the first can 206 and a second ammonia coverage ratio $\theta_2$ for the second can 208 can be determined from $$\frac{d\theta_1}{dt} = -(r_{ox1} + r_{de1})\theta_1 - r_{rd1}\theta_1(1-\eta_1)u_1 + r_{ad1}(1-\theta_1)(1-\xi_1)u_2 \quad (1)$$

$$\frac{d\theta_2}{dt} = -(r_{ox2} + r_{de2})\theta_2 - r_{rd2}\theta_2(1-\eta)u_1 + r_{ad2}(1-\theta_2)(1-\xi)u_2$$

where $r_{ox1}$ and $r_{ox2}$ are SCR catalyst NH3 oxidation rates in the first and second cans 206 and 208, respectively, as a function of catalyst temperature T; $r_{de1}$ and $r_{de2}$ are SCR catalyst NH3 desorption rates in the first and second cans 206 and 208, respectively, as a function of catalyst temperature T; $r_{rd1}$ and $r_{rd2}$ are SCR catalyst NOx reduction rates in the first and second cans 206 and 208, respectively, a function of catalyst temperature T; $r_{ad1}$ and $r_{ad2}$ are SCR catalyst NH3 adsorption rates in the first and second cans 206 and 208, respectively, as a function of catalyst temperature T; $u_1$ is the NOx input (NOx,in) into the SCR system; and $u_2$ is the ammonia injected into the SCR system. MPC control may require closed-loop feedback of NOx out from first SCR can $y_1$, NOx out from second SCR CAN $y_2$, NH3 slip from first SCR can $y_3$, and NH3 slip from second SCR can $y_4$, where $$y_1 = (1-\eta_1)u_1 = f_1(\theta_1, u_1)$$

$$y_2 = (1-\eta)u_1 = f_2(\theta_1, \theta_2, u_1)$$

$$y_3 = (1-\xi_1)u_2 = f_3(\theta_1, u_2)$$

$$y_4 = (1-\xi)u_2 = f_4(\theta_1, \theta_2, u_1, u_2)$$

where $\zeta$ is a total NH3 conversion efficiency of the SCR catalysts, and $\zeta_1$ is the NH3 conversion efficiency of the first SCR catalyst. $\eta_1$ and $\eta$ and $\zeta$ and $\zeta_1$ may be calculated from equations (2), (3) and (4) or otherwise determined as described in further detail below.

Model Predictive Control (MPC) module 204 may implement a unique second order discretized control-oriented SCR model (1) to calculate the can conversion efficiency for each SCR catalyst 206, 208. NOx and NH3 can conversion efficiencies may depend on, or may be functions of: (1) catalyst NH3 max storage capacity, (2) catalyst NH3 coverage ratio, (3) exhaust flow space velocity, and (4) the four catalyst reaction rates. Exhaust flow space velocity may be defined as exhaust volume flow rate divided by total SCR volume. The detailed calculations for first and second NOx can conversion efficiencies $\eta_1$ and $\eta_2$ can be defined as $$\eta_1 = \frac{u_1 - y_1}{u_1} = \frac{r_{rd1}\Theta_1\theta_1}{Q + r_{rd1}\Theta_1\theta_1} \quad (2)$$

$$\eta_2 = \frac{u_1 - y_2}{y_1} = \frac{r_{rd2}\Theta_2\theta_2}{Q + r_{rd2}\Theta_2\theta_2}$$

where Q is the exhaust flow space velocity, and $\Theta_1$ and $\Theta_2$ are maximum NH3 storage capacities in the first and second SCR cans 206 and 208, respectively. NOx conversion efficiency of the total SCR system can be defined as $$\eta = \eta_1 + \eta_2 - \eta_1\eta_2 \quad (3)$$

A total NH3 conversion efficiency $\zeta$ for the entire SCR system and NH3 conversion efficiency $\zeta_1$ for the first SCR catalyst 206 may be defined as:

$$\xi_1 = \frac{r_{ad1}\Theta_1(1-\theta_1)u_2 - r_{rd1}\Theta_1\theta_1}{u_2(Q + r_{ad1}\Theta_1(1-\theta_1))}, \quad (4)$$

$$\xi = \left(1 - \frac{Q(r_{de1}\Theta_1\theta_1 + r_{de2}\Theta_2\theta_2) + r_{de2}r_{ad1}\Theta_1\Theta_2\theta_2(1-\theta_1) + Q^2 u_2}{u_2(Q + r_{ad1}\Theta_1(1-\theta_1))(Q + r_{ad2}\Theta_2(1-\theta_2))}\right) \forall u_2 > 0$$

This SCR model may therefore take on a general nonlinear system of the form:

$$y_4 = \frac{r_{de2}\Theta_2\theta_2 + Qy_3}{Q + r_{ad2}\Theta_2(1-\theta_2)}, \quad y_3 = \frac{r_{de1}\Theta_1\theta_1 + Qu_2}{Q + r_{ad1}\Theta_1(1-\theta_1)}$$

$$\left.\begin{aligned}\frac{d\theta_1}{dt} &= f_1(\theta_1, u_1, u_2, T, Q)\\ \frac{d\theta_2}{dt} &= f_2(\theta_1, \theta_2, u_1, u_2, T, Q)\\ y_1 &= g_1(\theta_1, u_1, T, Q)\\ y_2 &= g_2(\theta_1, \theta_2, u_1, T, Q)\\ y_3 &= g_3(\theta_1, u_2, T, Q)\\ y_4 &= g_4(\theta_1, \theta_2, u_1, u_2, T, Q)\end{aligned}\right\} \quad (5)$$

This open-loop model may be implemented to predict ammonia coverage ratios θ1 and θ2, but converges to true values slowly, to improve the prediction regardless of any initial values of the coverage ratios, Extended Kalman Filter (EKF) may be applied to this nonlinear system to estimate the true values θ1 and θ2 using the available measured inputs and outputs to the SCR system.

MPC module 204 is designed to then calculate a modified reductant injection parameter (e.g., an optimal injection pulse-width and/or an optimal reductant injection volume) from the NOx and NH3 can conversion efficiencies calculated above. Operation of the dosing injector 116 can be concomitantly regulated based on the calculated modified reductant injection parameter to optimize SCR system performance. By way of non-limiting example, one of the control goals for the LPV-MPC architecture of FIG. 2 may be to find an optimal injection of urea $u_2 = C_{NH3,in}$ so as to minimize a cost function J, subject to the system dynamic equation (1) and the input and output constraints $$\min_{u_2} J = \frac{1}{N}\sum_{k=1}^{N}\left(\begin{array}{c}S_1(y_{1des[k]} - y_{1[k]})^2 + S_2(y_{2des[k]} - y_{2[k]})^2 + S_3 y_{4[k]}^2 ++ \\ S_4(\theta_{1des[k]} - \theta_{1[k]})^2 + Ru_{2[k]}^2 + W(du_{2[k]})^2\end{array}\right)$$

which may require defining a set point transformation given the desired NOx conversion efficiencies $\eta_1$ and $\eta_2$, as $$y_{1des} = (1-\eta_{1des})u_1, \; y_{2des} = (1-\eta_{2des})(1-\eta_{1des})u_1,$$

$$\theta_{1des} = \frac{Q\eta_{1des}}{r_{rd1}\Theta_1(1-\eta_{1des})}$$

The state space model (5) can be continuously linearized, or can take a quasi-state dependent LPV form, e.g., described by the control oriented model (1). In extreme cases, $y_{1,des}$ and $y_{2des}$ can be set to zero. For at least some system designs, the first SCR catalyst is physically larger than the second SCR catalyst; thus, NOx conversion of the first can is dominant, which may depend on the level of ammonia coverage ratio, where this desired ammonia coverage ratio is determined by the relation:

$$\theta_{1des} = \frac{Q\eta_{1des}}{r_{rd1}\Theta_1(1-\eta_{1des})}$$

The cost function J may be calculated on a moving average window with N samples k=1, 2 . . . . N, subject to SCR system constraints described above as $y_1$, $y_2$, $y_3$ and $y_4$. The physical meaning of this optimization may be to: make the actual outlet NOx y1(k) from the first SCR can track y1des(k) (e.g., minimize SCR outlet NOx if y1des(k)=0);

make the actual outlet NOx y2(k) from the second SCR can track $y_{2des}(k)$ (e.g., minimize SCR outlet NOx if $y_{2des}(k)=0$); minimize NH3 slip, i.e. y4(k); maintain the first SCR can ammonia coverage ratio at a desired level, e.g., where the fourth term in the cost function can be replaced by a constraint θ1>θ1,des; minimize injected urea amount u2; and/or confine the rate of urea injection. In the cost function J, the values S1, S2, S3, S4, R and W may be designated as "weights" that are used to balance the optimization terms. There may be several methods to solve this optimization control problem, including applying standard nonlinear optimization techniques, called NMPC (nonlinear model predictive control), and linearizing the nonlinear system at selected operating conditions, or at each sample time t, then apply MPC to the set of linearized system to find the control u2

$$u_2 = F(\hat{y}_1(k), \hat{y}_2(k), \hat{y}_4(k), \hat{\theta}_1(k), \hat{\theta}_2(k))$$

The Set Point Transformation (SPT) block may transfer desired NOx conversions to desired outlet NOx for both SCR CANs, and the MPC block may find the optimal control for injected Urea u2=NH3,in, where the feedback signals are provided by the Kalman filter(s).

This model can simulate SCR system responses if the initial conditions of the various dynamic states are known. In accord with at least some of the disclosed concepts, a simplified Extended Kalman Filter (EKF) is used to estimate these states. By way of example, a recursive Kalman filter may be used to estimate ammonia coverage ratio based on a nonlinear model as $$\dot{\theta}_1 = -(r_{ox1}+r_{de1})\theta_1 - r_{rd1}\theta_1(1-\hat{\eta}_1)u_1 + r_{ad1}(1-\theta_1)(1-\xi_1)u_2$$

discretize $$\dot{\theta}_2 = -(r_{ox2}+r_{de2})\theta_2 - r_{rd2}\theta_2(1-\hat{\eta})u_1 + r_{ad2}(1-\theta_2)(1-\xi)u_2$$

and $$y_{2,sen} = y_2 + K(T,Q)y_4 = \frac{Q^2}{(Q+r_{rd2}\Theta_2\theta_2)(Q+r_{rd1}\Theta_1\theta_1)}u_1 + K(T,Q)(1-\hat{\xi})u_2$$

where $u_1$ is the current NOx input into the SCR system, e.g., via SCR conduit 214, ζ is a total NH3 conversion efficiency of the SCR catalysts, $r_{rd1}$ and $r_{rd2}$ are SCR catalyst NOx reduction rates in the first and second SCR catalysts, respectively, $\Theta_1$ and $\Theta_2$ are the maximum NH3 storage capacities of the first and second SCR catalysts, respectively; $\theta_1$ and $\theta_2$ are ammonia coverage ratios of the first and second SCR catalysts, respectively; T is a current NOx sensor temperature, Q is exhaust flow space velocity, and K is a value of gain such that K(T,Q) is gain value as a nonlinear function of T and Q. Due to chemical species cross-sensitivity, the measurement of the current NOx sensors at an SCR outlet is impacted by the slipped out NH3 entering the NOx sensors. In this extended Kalman filter, an NOx sensor model that takes into account this cross-sensitivity effect is added to the original SCR model; the NOx sensor output $y_{2,sen}$ is modeled as a function of actual SCR outlet NOx and NH3 slip.

Depending, for example, on how the SCR sensors are selected and where they are installed, the EKF designs may also be simplified and designed separately for each SCR can. As a non-limiting example, engine out NOx can be estimated by a virtual sensor or model; an NOx sensor may be installed at the outlet of the first SCR can, and a second NOx sensor may be installed at the outlet of the second SCR can. For this configuration, two EKFs can be designed for each SCR can to estimate ammonia coverage ratios. The first EKF is designed based on the first can SCR model:

$$\frac{d\theta_1}{dt} = f_1(\theta_1, u_1, u_2)$$

$$y_{NOx,Sen1} = f_2(\theta_1, u_1) + K_1(T_1, Q) \cdot f_3(\theta_1, u_2)$$

Where $y_{NOx,sen1}$ is the measurement from the first NOx sensor. The EKF will predict ammonia coverage ratio, the NOx and NH3 out from the first SCR can $$\hat{\theta}_1, \hat{y}_1 = f_2(\hat{\theta}_1, u_1), \hat{y}_3 = f_3(\hat{\theta}_1, u_2)$$

The second EKF may then be designed based on the second SCR can model:

$$\frac{d\theta_2}{dt} = f_4(\theta_2, \hat{y}_1, \hat{y}_3)$$

$$y_{NOx,Sen2} = f_5(\theta_2, \hat{y}_1) + K_2(T_2, Q) \cdot f_6(\theta_2, \hat{y}_3)$$

Where $y_{NOx,sen2}$ is the measurement from the second NOx sensor. The EKF will predict ammonia coverage ratio, the NOx and NH3 out from the second SCR can $$\hat{\theta}_2, \hat{y}_2 = f_5(\hat{\theta}_2, \hat{y}_1), \hat{y}_4 = f_6(\hat{\theta}_2, \hat{y}_3)$$

As another exemplar example, engine out NOx can be estimated by a virtual sensor or model, a NH3 sensor is installed at the outlet of the first SCR can, and a NOx sensor is installed at the outlet of the second SCR can. For this configuration, the first EKF is designed based on the first can SCR model:

$$\frac{d\theta_1}{dt} = f_1(\theta_1, u_1, u_2)$$

$$y_{NH3,Sen} = f_3(\theta_1, u_2)$$

Where $y_{NH3,sen}$ is the measurement from the NH3 sensor. The EKF will predict ammonia coverage ratio, the NOx out from the first SCR can $$\hat{\theta}_1, \hat{y}_1 = f_2(\hat{\theta}_1, u_1)$$

Then the second EKF is designed based on the second SCR can model:

$$\frac{d\theta_2}{dt} = f_4(\theta_2, \hat{y}_1, \hat{y}_{NH3,sen})$$

$$y_{NOx,Sen} = f_5(\theta_2, \hat{y}_1) + K_2(T_2, Q) \cdot f_6(\theta_2, y_{NH3,sen})$$

Where $y_{NOx,sen}$ is the measurement from the NOx sensor. The EKF will predict ammonia coverage ratio, the NOx and NH3 out from the second SCR can $$\hat{\theta}_2, \hat{y}_2 = f_5(\hat{\theta}_2, \hat{y}_1), \hat{y}_4 = f_6(\hat{\theta}_2, y_{NH3,sen})$$

As yet another representative example, engine out NOx can be estimated by a virtual sensor or model, a NOx sensor is installed at the outlet of the first SCR can, and a NH3 sensor is installed at the outlet of the second SCR can. For this configuration, the first EKF is designed based on the first can SCR model:

$$\frac{d\theta_1}{dt} = f_1(\theta_1, u_1, u_2)$$

$$y_{NOx,Sen} = f_2(\theta_1, u_1) + K(T_1, Q) \cdot f_3(\theta_1, u_2)$$

Where $y_{NOx,sen}$ is the measurement from the NOx sensor. The EKF will predict ammonia coverage ratio, the NOx and NH3 out from the first SCR can $$\hat{\theta}_1, \hat{y}_1 = f_2(\hat{\theta}_1, u_1), \hat{y}_3 = f_3(\hat{\theta}_1, u_2)$$

Then the second EKF is designed based on the second SCR can model:

$$\frac{d\theta_2}{dt} = f_4(\theta_2, \hat{y}_1, \hat{y}_3)$$

$$y_{NH3,Sen} = f_6(\theta_2, \hat{y}_3)$$

Where $y_{NH3,sen}$ is the measurement from the NH3 sensor. The EKF will predict ammonia coverage ratio, the NOx out from the second SCR can $$\hat{\theta}_2, \hat{y}_2 = f_5(\hat{\theta}_2, \hat{y}_1)$$

Using NOx sensor and/or NH3 sensor measurements from SCR catalyst outlet, in conjunction with data inputs from engine out NOx measurements and NH3 injection, the extended Kalman filter can be employed to estimate one or more SCR states and outputs, such as ammonia coverage ratio θ1 and θ2 at the sample time k. These estimated states may be used to update system feedback-control information and/or to calculate NOx conversion efficiencies and NH3 conversion efficiencies, which can then be fed back to the SCR model. The Kalman filter may be set to repeat this process at the next sample time k=k+1.

In SCR system design, the first SCR catalyst may be larger in size than the second SCR catalyst; in so doing, it can be said that a majority of NOx conversion efficiency occurs within the first SCR catalyst. Desired SCR NOx conversion efficiency for the first and second cans is defined, and desired SCR outlet NH3 slip rates are defined to back calculate desired outlet NOx and NH3 for the first SCR CAN predicted from the models below $$y_{1des} = (1 - \eta_{1des})u_1,$$

$$y_{4des} < \gamma(\text{slip constraint}),$$

$$y_{3,des[k]} = [y_{4des}(Q + r_{ad2}\Theta_2(1-\theta_2)) - r_{de2}\Theta_2\theta_2]/Q,$$

$$\theta_1 >= \frac{c \cdot Q\eta_{1des}}{r_{rd1}\Theta_1(1-\eta_{1des})}, 0.2 < c < 1$$

Where η1des(T,Q,NOx_eng) may be defined as a function of the first can SCR temperature, space velocity and engine out NOx. An optimal injected urea amount can be defined by minimizing the cost function:

$$J = \min_{u_2} \frac{1}{N}\sum_{k=1}^{N} S_1(y_{1des[k]} - y_{1[k]})^2 + S_2(y_{3,des[k]} - y_{3[k]})^2 + Ru_{2[k]}^2$$

In this instance, the first optimization term may control the NOx out from the first SCR catalyst to meet a target performance, and the second optimization term may control the NH3 out from the first SCR catalyst to meet an NH3 slip target. A final format of control u2 is a feedback controller $$u_2 = F(\hat{y}_1(k), \hat{y}_3(k), \hat{\theta}_1(k), \hat{\theta}_2(k))$$

A Kalman filter may then be run in a manner similar to that described above. In this simplified algorithm, an added feedforward control term will inject the number of moles of NH3 for the same amount of moles of NOx coming out from an engine. The MPC control may further optimize this amount such that the total control u2 will minimize the cost function J.

It is envisioned that the MPC architecture 200 include different control hardware configurations to provide the same or similar SCR control. One option is to install NOx sensors and/or NH3 sensors at different locations on the SCR system. It is also envisioned that one of more of the sensors be replaced with virtual sensors. Other options include utilizing alternative control-oriented SCR models. As a non-limiting example, the system may employ the following state equation $$\frac{\theta_1(k+1) - \theta_1(k)}{\Delta t} = -r_{ox1}\theta_1 - \frac{Qr_{rd1}\theta_1}{(Q + r_{rd1}\Theta_1\theta_1)}u_1 + \frac{Q\xi_1}{\Theta_1}u_2$$

$$\frac{\theta_2(k+1) - \theta_1(k)}{\Delta t} =$$

$$-r_{ox2}\theta_2 - \frac{Q^2 r_{rd2}\theta}{(Q + r_{rd2}\Theta_2\theta_2)(Q + r_{rd1}\Theta_1\theta_1)}u_1 + \frac{Q\xi_2(1-\xi_1)}{\Theta_2}u_2$$

with the following information updated $$y_1 = \frac{Q}{Q + r_{rd1}\Theta_1\theta_1}u_1$$

$$y_2 = (1-\eta)u_1 = \frac{Q^2}{(Q + r_{rd2}\Theta_2\theta_2)(Q + r_{rd1}\Theta_1\theta_1)}u_1$$

$$y_3 = (1-\xi_1)u_2$$

$$y_4 = (1-\xi)u_2$$

Another option for two-can SCR models includes singular perturbation, e.g., slow systems with theta1 and theta2 for coverage ratio, the rest may be considered fast systems, where $$\dot{x}_1 = -Qx_1 - r_{rd1}\Theta_1\theta_1 x_1 + Qu_1$$

$$\dot{\theta}_1 = -(r_{rd1}x_1 + r_{ox1} + r_{de1})\theta_1 + r_{ad1}(1-\theta_1)x_3$$

$$\dot{x}_3 = -Qx_3 - r_{ad1}\Theta_1(1-\theta_1)x_3 + r_{de1}\Theta_1\theta_1 + Qu_2$$

$$\dot{x}_1 = -Qx_4 - r_{rd2}\Theta_2\theta_2 x_4 + Qx_1$$

$$\dot{\theta}_2 = -(r_{rd2}x_4 + r_{ox2} + r_{de2})\theta_2 + r_{ad2}(1-\theta_2)x_6$$

$$\dot{x}_6 = -Qx_6 - r_{ad2}\Theta_2 x_6 + (r_{de2}\Theta_2 + r_{ad2}\Theta_2 x_6)\theta_2 + Qx_3$$

where the first three equations respectively designate NOx, ammonia storage ratio, and NH3 for the first SCR catalyst, and the second three equations respectively designate NOx, ammonia storage ratio, and NH3 for the second SCR catalyst. Another option is to employ a second order linearized SCR LPV discrete model where $$\frac{dx}{dt} = \underbrace{F(x_0, u_0)}_{F_0} + \underbrace{\frac{\partial F}{\partial x}\bigg|_0}_{A}(x - x_0) + \underbrace{\frac{\partial F}{\partial x}\bigg|_0}_{B}(u - u_0) =$$

$$Ax + Bu + \underbrace{(F_0 - Ax_0 - Bu_0)}_{f} = A(x_0, u_0)x + B(x_0, u_0)u + f(x_0, u_0)$$

$$y = G(x_0, u_0) + \underbrace{\frac{\partial G}{\partial x}\bigg|_0}_{C}(x - x_0) + \underbrace{\frac{\partial G}{\partial u}\bigg|_0}_{D}(u - u_0) = Cx + Du + g(x_0, u_0)$$

and $$F(x, u) = \begin{bmatrix} f_1(\theta_1, u_1, u_2) \\ f_2(\theta_1, \theta_2, u_1, u_2) \end{bmatrix}, G(x, u) = \begin{bmatrix} (1-\eta_1)u_1 \\ (1-\eta)u_1 \\ (1-\xi)u_2 \end{bmatrix}$$

$$x = [\theta_1 \ \theta_2]^T, u = [u_1 \ u_2]^T, y = [y_1 \ y_2 \ y_3]^T$$

and where the system is discretized.

Figure 4:
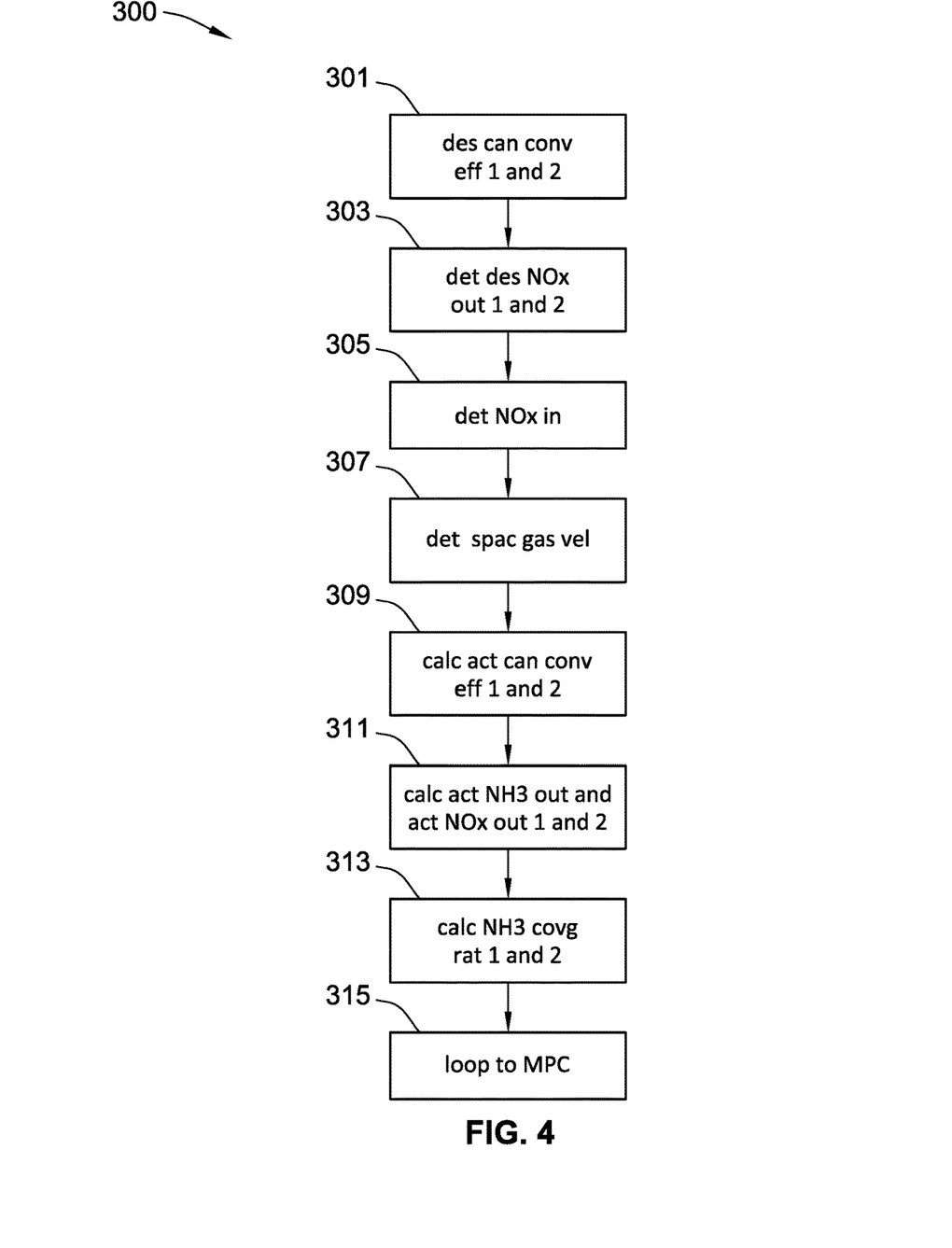
FIG. 4 is a flowchart for a representative MPC control scheme or algorithm that may correspond to instructions executed by onboard control-logic circuitry or other computer-based device of a motor vehicle in accord with aspects of the present disclosure.

With reference now to the flow chart of FIG. 4, an improved method or algorithm for MPC control during operation of an internal combustion engine, such as ICE assembly 12 of FIG. 1, for a motor vehicle, such as the automobile 10, for example, is generally described at 300 in accordance with aspects of the present disclosure. FIG. 4 can be representative of an algorithm that corresponds to at least some instructions that can be stored, for example, in main or auxiliary memory, and executed, for example, by an ECU, CPU, an on-board or remote vehicle control logic circuit, or other device, to perform any or all of the above and/or below described functions associated with the disclosed concepts.

The method 300 of FIG. 4 starts at block 301 with receiving desired can conversion efficiencies for first and second SCR catalysts. From these values, a desired NOx out for each can is calculated at block 303. The method 300 continues to block 305 with determining the NOx in for the SCR system (e.g., via fluid conduit NOx sensor 218 of FIG. 2). At block 307, exhaust flow space velocity is determined. From the foregoing values, a respective can conversion efficiency is calculated for each can in the SCR system, e.g., at block 309.

The method 300 of FIG. 4 proceeds next to block 311 to measure, calculate or otherwise determine the actual NH3 and NOx out for each SCR catalyst in the SCR system. Using these values, an NH3 conversion rate is determined for each can at block 313. These values are fed back in block 315 to the MPC module for system updates. The method 300 of FIG. 4 may be modified to include greater or fewer blocks than that which are shown in the drawings. In the same vein, the illustrated control method may include any of the features, options and alternatives described herein.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A model predictive control (MPC) system for regulating a selective catalytic reduction (SCR) system, the SCR system including first and second SCR catalysts, a storage tank storing a reductant, a conduit fluidly connecting the storage tank to the SCR catalysts, and a dosing injector for injecting the reductant into the conduit, the MPC system comprising:
    a fluid conduit NOx sensor configured to detect a current nitrogen oxide (NOx) input received by the conduit;
    first and second SCR catalyst NOx sensors each configured to detect a respective current NOx output of a respective one of the first and second SCR catalysts;

first and second SCR catalyst NH3 sensors each configured to detect a respective current ammonia (NH3) slip volume of a respective one of the SCR catalysts; and a programmable electronic control unit communicatively connected to the fluid conduit NOx sensor, the SCR catalyst NOx sensors, the SCR catalyst NH3 sensors, and the dosing injector, the electronic control unit being configured to:

receive an indication of a respective desired can conversion efficiency for each of the first and second SCR catalysts;

determine, from the first and second desired can conversion efficiencies, a respective desired can NOx output for each of the SCR catalysts;

determine a respective maximum NH3 storage capacity of each of the first and second SCR catalysts;

calculate a respective current can conversion efficiency for each of the SCR catalysts from the current NOx input, first and second current NOx outputs, first and second desired can NOx outputs, first and second current NH3 slip volumes, and first and second maximum NH3 storage capacities;

calculate a modified reductant injection parameter from the first and second current can conversion efficiencies for the SCR catalysts; and command the dosing injector to inject the reductant into the conduit based on the modified reductant injection parameter.

2. The MPC system of claim 1, wherein the electronic control unit is further configured to determine a respective ammonia coverage ratio for the first and second SCR catalysts, and wherein calculating the first and second current can conversion efficiencies for the SCR catalysts is further based on the first and second ammonia coverage ratios.

3. The MPC system of claim 2, wherein the electronic control unit is further configured to determine an exhaust flow space velocity, and wherein calculating the first and second current can conversion efficiencies for the SCR catalysts is further based on the exhaust flow space velocity.

4. The MPC system of claim 3, wherein the first and second current can conversion efficiencies, respectively designated as $\eta_1$ and $\eta_2$, are calculated as $$\eta_1 = \frac{r_{rd1}\Theta_1\theta_1}{Q + r_{rd1}\Theta_1\theta_1}, \eta_2 = \frac{r_{rd2}\Theta_2\theta_2}{Q + r_{rd2}\Theta_2\theta_2}$$

where $r_{rd1}$ and $r_{rd2}$ are catalyst NOx reduction rates in the first and second SCR catalysts, respectively, $\Theta_1$ and $\Theta_2$ are the maximum NH3 storage capacities of the first and second SCR catalysts, respectively, $\theta_1$ and $\theta_2$ are ammonia coverage ratios in the first and second SCR catalysts, respectively, and Q is the exhaust flow space velocity.

5. The MPC system of claim 2, wherein determining the first and second ammonia coverage ratios includes applying a recursive Kalman filter to estimate each of the ammonia coverage ratios.

6. The MPC system of claim 5, wherein applying the recursive Kalman filter includes modeling a current NOx output of the second SCR catalyst.

7. The MPC system of claim 6, wherein the modeled current NOx output of the second SCR catalyst, designated as $y_{2,sen}$, is calculated as $$y_{2,sen} = \frac{Q^2}{(Q + r_{rd2}\Theta_2\theta_2)(Q + r_{rd1}\Theta_1\theta_1)}u_1 + K(T,Q)(1-\hat{\xi})u$$

where $u_1$ is the current NOx input of the SCR conduit, $\zeta$ is a total NH3 conversion efficiency of the SCR catalysts, $r_{rd1}$ and $r_{rd2}$ are catalyst NOx reduction rates in the first and second SCR catalysts, respectively, $\Theta_1$ and $\Theta_2$ are the maximum NH3 storage capacities of the first and second SCR catalysts, respectively, $\theta_1$ and $\Theta_2$ are ammonia coverage ratios in the first and second SCR catalysts, respectively, T is a current NOx sensor temperature, Q is the exhaust flow space velocity, and K is a value of gain as a nonlinear function of T and Q.

8. The MPC system of claim 7, wherein the recursive Kalman filter is further applied to calculate a respective NH3 conversion efficiency for each of the SCR catalysts.

9. The MPC system of claim 1, wherein the electronic control unit is further configured to calculate a total current can conversion efficiency $\eta_{tot}$ for the SCR system from the first and second current can conversion efficiencies, respectively designated $\eta_1$ and $\eta_2$, as $$\eta = \eta_1 + \eta_2 - \eta_1\eta_2.$$

10. The MPC system of claim 1, wherein the first desired can NOx output, designated as $y_{1,des}$, of the first SCR catalyst and the second desired can NOx output, designated as $y_{2,des}$, of the second SCR catalyst are calculated via a Set Point Transformation (SPT) as $$y_{1des} = (1-\eta_{1des})u_1,$$

$$y_{2des} = (1-\eta_{2des})(1-\eta_{1des})u_1,$$

where $\eta_j$ and $\eta_2$ are the first and second current can conversion efficiency, respectively, $u_1$ is the current NOx input of the SCR conduit.

11. The MPC system of claim 1, wherein the electronic control unit is further configured to determine a first desired ammonia coverage ratio $\theta_{1,des}$ for the first SCR catalyst as $$Q_{1des} = \frac{Q\eta_{1des}}{r_{rd1}\Theta_1(1-\eta_{1des})}$$

where $\eta_{1,des}$ is a first desired current can conversion efficiency of the first SCR catalyst, Q is the exhaust flow space velocity, $\Theta_1$ is the maximum NH3 storage capacity of the first SCR catalyst, and $r_{rd1}$ is a catalyst NOx reduction rate in the first SCR catalyst.

12. A motor vehicle, comprising:
a vehicle body defining an engine compartment;
an internal combustion engine (ICE) assembly stowed in the engine compartment, the ICE assembly including an engine block with a plurality of cylinders bores, and a plurality of pistons each reciprocally movable within a respective one of the cylinder bores;
a selective catalytic reduction (SCR) system fluidly coupled to the ICE assembly, the SCR system including a first SCR catalyst in series with a second SCR catalyst, a storage tank storing a fluid reductant, an SCR conduit fluidly connecting the storage tank to the first and second SCR catalysts, and a dosing injector operable to inject the reductant into the SCR conduit;
a fluid conduit NOx sensor configured to detect a current nitrogen oxide (NOx) input received by the SCR fluid conduit from the ICE assembly;

first and second SCR catalyst NOx sensors each configured to detect a respective current NOx output of a respective one of the first and second SCR catalysts;

first and second SCR catalyst NH3 sensors each configured to detect a respective current ammonia (NH3) slip volume of a respective one of the SCR catalysts; and an electronic control unit communicatively connected to the fluid conduit NOx sensor, the SCR catalyst NOx sensors, the SCR catalyst NH3 sensors, and the dosing injector, the electronic control unit being programmed to:

receive an indication of a respective desired can conversion efficiency for each of the first and second SCR catalysts;

determine, from the first and second desired can conversion efficiencies, a respective desired can NOx output for each of the SCR catalysts;

determine a respective maximum NH3 storage capacity of each of the first and second SCR catalysts;

calculate a respective current can conversion efficiency for each of the SCR catalysts from the current NOx input, first and second current NOx outputs, first and second desired can NOx outputs, first and second current NH3 slip volumes, and first and second maximum NH3 storage capacities;

calculate a modified reductant injection parameter from the first and second current can conversion efficiencies for the SCR catalysts; and regulate operation of the dosing injector based on the calculated modified reductant injection parameter.

13. A method of operating a model predictive control (MPC) system for regulating a selective catalytic reduction (SCR) exhaust aftertreatment system, the SCR system including first and second SCR catalysts, a storage tank storing a reductant, a conduit fluidly connecting the storage tank to the SCR catalysts, and a dosing injector for injecting the reductant into the conduit, the method comprising:

receiving, from a fluid conduit NOx sensor, a signal indicative of a current nitrogen oxide (NOx) input received by the conduit;

receiving, from first and second SCR catalyst NOx sensors, signals indicative of first and second current NOx outputs of the first and second SCR catalysts, respectively;

receiving, from first and second SCR catalyst NH3 sensors, signals indicative of first and second current ammonia (NH3) slip volumes of the first and second SCR catalysts, respectively;

receiving indications first and second desired can conversion efficiencies of the first and second SCR catalysts, respectively;

determining, from the first and second desired can conversion efficiencies, first and second desired can NOx outputs for the first and second SCR catalysts, respectively;

determining first and second maximum NH3 storage capacities of the first and second SCR catalysts, respectively;

calculating a respective current can conversion efficiency for each of the SCR catalysts from the current NOx input, first and second current NOx outputs first and second desired can NOx outputs, first and second current NH3 slip volumes, and first and second maximum NH3 storage capacities;

calculating a modified reductant injection parameter from the first and second current can conversion efficiencies for the SCR catalysts; and commanding the dosing injector to inject the reductant into the conduit based on the modified reductant injection parameter.

14. The method of claim 13, further comprising determining first and second ammonia coverage ratios for the first and second SCR catalysts, respectively, wherein calculating the first and second current can conversion efficiencies for the SCR catalysts is further based on the first and second ammonia coverage ratios.

15. The method of claim 14, further comprising determining an exhaust flow space velocity, wherein calculating the first and second current can conversion efficiencies for the SCR catalysts is further based on the exhaust flow space velocity.

16. The method of claim 15, wherein the first and second current can conversion efficiencies, respectively designated $\eta_1$ and $\eta_2$, are calculated as $$\eta_1 = \frac{r_{rd1}\Theta_1\theta_1}{Q + r_{rd1}\Theta_1\theta_1}, \eta_2 = \frac{r_{rd2}\Theta_2\theta_2}{Q + r_{rd2}\Theta_2\theta_2}$$

where $r_{rd1}$ and $r_{rd2}$ are catalyst NOx reduction rates in the first and second SCR catalysts, respectively, $\Theta_1$ and $\Theta_2$ are the maximum NH3 storage capacities of the first and second SCR catalysts, respectively, $\theta_1$ and $\theta_2$ are ammonia coverage ratios in the first and second SCR catalysts, respectively, and Q is the exhaust flow space velocity.

17. The method of claim 14, wherein determining the first and second ammonia coverage ratios includes applying a recursive Kalman filter to estimate each of the ammonia coverage ratios.

18. The method of claim 17, wherein applying the recursive Kalman filter includes modeling a current NOx output of the second SCR catalyst.

19. The method of claim 13, further comprising calculating a total current can conversion efficiency $\eta_{tot}$ for the SCR system from the first and second current can conversion efficiencies, respectively designated $\eta_1$ and $\eta_2$, as $$\eta = \eta_1 + \eta_2 - \eta_1\eta_2.$$

20. The method of claim 13, wherein the first desired can NOx output, designated as $y_{1,des}$, of the first SCR catalyst and the second desired can NOx output, designated as $y_{2,des}$, of the second SCR catalyst are calculated via a Set Point Transformation (SPT) as $$y_{1des} = (1 - \eta_{1des})u_1,$$

$$y_{2des} = (1 - \eta_{2des})(1 - \eta_{1des})u_1,$$

where $\eta_1$ and $\eta_2$ are the first and second current can conversion efficiency, respectively, $u_1$ is the current NOx input of the SCR conduit.

* * * * *